United States Patent
Navarro-Dimm et al.

(10) Patent No.: US 11,341,266 B2
(45) Date of Patent: May 24, 2022

(54) DETECTING AND PREVENTING STORAGE OF UNSOLICITED SENSITIVE PERSONAL INFORMATION

(71) Applicant: AT&T Intellectual Property I, L.P., Atlanta, GA (US)

(72) Inventors: Jason Navarro-Dimm, Cumming, GA (US); John Maski, Alameda, CA (US); Anish Harshan, San Ramon, CA (US); Averal Reynolds, North Richland Hills, TX (US); John Gerardi, St. Louis, MO (US); Zulqurnain Hussain, Monroe, WA (US); Claude Garalde, Fairfield, CA (US); Devin Edmiston, Plano, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 461 days.

(21) Appl. No.: 16/352,123

(22) Filed: Mar. 13, 2019

(65) Prior Publication Data
US 2020/0293680 A1 Sep. 17, 2020

(51) Int. Cl.
G06F 21/62 (2013.01)
H04L 67/55 (2022.01)
G06F 3/0481 (2022.01)

(52) U.S. Cl.
CPC ........ *G06F 21/6245* (2013.01); *G06F 3/0481* (2013.01); *H04L 67/26* (2013.01); *G06F 21/6263* (2013.01)

(58) Field of Classification Search
CPC ............ G06F 21/6245; G06F 21/6263; G06F 3/0481; G06F 3/04895; G06F 40/279;
(Continued)

(56) References Cited

U.S. PATENT DOCUMENTS 7,451,481 B2 11/2008 Bauer et al.
7,519,591 B2 4/2009 Landi et al.
(Continued)

FOREIGN PATENT DOCUMENTS

WO 2017187207 A1 4/2016

OTHER PUBLICATIONS

Yang et al., "AppIntent: Analyzing Sensitive Data Transmission in Android for Privacy Leakage Detection," Proceedings of the 2013 ACM SIGSAC Conference on Computer & Communications Security, Nov. 2013, 12 pages.
(Continued)

*Primary Examiner* — Andrew R Dyer
(74) *Attorney, Agent, or Firm* — Amin, Turocy & Watson, LLP

(57) ABSTRACT

A sensitive personal information detection and prevention system can receive a text string based on a user input into a field of a graphical user interface associated with a server. The system can, prior to storage of the text string by the server device, determine whether the text string comprises sensitive personal information, wherein the determining can comprise referring to a configurable map that can be updated. The system can, in response to determining that the text string comprises the sensitive personal information, prevent the storage of the text string by the server. It can facilitate providing a message for display on the graphical user interface comprising an indication that the text string comprises the sensitive personal information, and an instruction to re-submit the text string without the sensitive personal information, or a notification that the sensitive personal information has been masked.

20 Claims, 12 Drawing Sheets

(58) Field of Classification Search
CPC ....... G06F 40/174; H04L 67/26; H04L 67/22; H04L 63/0421
USPC .......................................................... 726/26
See application file for complete search history.

(56) References Cited

U.S. PATENT DOCUMENTS

| | | | |
|---|---|---|---|
| 7,523,160 B2 | 4/2009 | Eida et al. | |
| 8,161,526 B2 | 4/2012 | Corrao et al. | |
| 8,301,771 B2 | 10/2012 | Singh et al. | |
| 8,745,053 B2 | 6/2014 | Bolton et al. | |
| 8,752,181 B2 | 6/2014 | Grzymala-Busse et al. | |
| 8,856,549 B2 | 10/2014 | Resch et al. | |
| 8,913,721 B1 | 12/2014 | Narayanan et al. | |
| 9,015,802 B1 | 4/2015 | Muthusrinivasan et al. | |
| 9,135,306 B2 | 9/2015 | Boback et al. | |
| 9,137,257 B2 | 9/2015 | Shuster | |
| 9,323,948 B2 | 4/2016 | Gupta et al. | |
| 9,401,886 B2 | 7/2016 | Bastide et al. | |
| 9,582,680 B2 | 2/2017 | Bilodeau et al. | |
| 9,799,029 B2 | 10/2017 | Neuwirth | |
| 9,870,485 B2 | 1/2018 | Li et al. | |
| 9,904,798 B2 | 2/2018 | Avrahami et al. | |
| 9,965,648 B1 | 5/2018 | Cheng et al. | |
| 9,977,920 B2 | 5/2018 | Danielson et al. | |
| 10,135,796 B2 * | 11/2018 | Iyer | G06F 21/6245 |
| 10,289,816 B1 * | 5/2019 | Malassenet | G06F 9/30036 |
| 2010/0125891 A1 | 5/2010 | Baskaran | |
| 2011/0239113 A1 | 9/2011 | Hung et al. | |
| 2011/0247081 A1 * | 10/2011 | Shelton | G06F 21/6209 726/28 |
| 2012/0116929 A1 * | 5/2012 | Gventer | G06F 21/60 705/28 |
| 2012/0180134 A1 | 7/2012 | Coughtrey et al. | |
| 2015/0193638 A1 | 7/2015 | Cook | |
| 2017/0195310 A1 * | 7/2017 | Tyler | G06F 21/554 |
| 2017/0337393 A1 | 11/2017 | Crowe et al. | |
| 2018/0018404 A1 | 1/2018 | Caldwell et al. | |
| 2018/0075254 A1 * | 3/2018 | Reid | G06F 40/205 |
| 2018/0137303 A1 * | 5/2018 | Farkash | H04L 63/083 |
| 2018/0276401 A1 * | 9/2018 | Allen | G06F 21/6245 |
| 2018/0350144 A1 * | 12/2018 | Rathod | A63F 13/216 |
| 2019/0050600 A1 * | 2/2019 | Sahoo | G06F 21/32 |
| 2019/0130123 A1 * | 5/2019 | Ben-Yair | G06F 21/6218 |
| 2019/0332658 A1 * | 10/2019 | Heckel | G06N 3/0454 |
| 2019/0340390 A1 * | 11/2019 | Richards | G06F 21/6227 |
| 2019/0342336 A1 * | 11/2019 | Finkelstein | H04L 63/20 |
| 2019/0354251 A1 * | 11/2019 | Schleifer | G06F 3/04897 |
| 2020/0105254 A1 * | 4/2020 | Sarir | H04L 67/18 |
| 2020/0195618 A1 * | 6/2020 | Linton | G06F 21/6263 |
| 2020/0257576 A1 * | 8/2020 | Gallagher | G06F 40/174 |
| 2020/0311304 A1 * | 10/2020 | Parthasarathy | G06F 11/3006 |
| 2020/0327252 A1 * | 10/2020 | McFall | G06F 21/602 |

OTHER PUBLICATIONS

Sabelfeld et al., "Language-Based Information-Flow Security," IEEE Journal On Selected Areas In Communications, Jan. 2013, vol. 21, No. 1, pp. 5-19, 15 pages.

* cited by examiner

AcmeCorp – Product Support

File  Edit  View  Options  Tools  Help

Get in Contact with AcmeCorp

If you still can't find the help you are looking for, please fill out the following informaion and someone from AcmeCorp will get in touch with you.

Product [M41A ▼]
205
Last Name [Netties]

210
Email [Cooper.Netties@email.com]

215
Phone Number [770-555-1984]

Additional Comments:  220

It's Coop. Just go ahead and charge my credit card to extend my warranty – my credit card number is 3940-4567-2989. Also open up another line of credit for me – my social security number is 555-77-9999. Call me or email me if you have any questions.

Submit
225

230
Support Forum
Post and chat with fellow customers. You may be able to get the help you need sooner.

235
Get Products
Need another product or solution? Visit our sales site

240
Live Chat
You can contact our live support, or use on-line chat to talk with a specialist.

FIG. 2

DETECTING AND PREVENTING STORAGE OF UNSOLICITED SENSITIVE PERSONAL INFORMATION

TECHNICAL FIELD

The present application relates generally to the field of data privacy and security, and more specifically to detecting and preventing the storage of unsolicited sensitive personal information (SPI).

BACKGROUND

Securing sensitive personal information (SPI), submitted through on-line forms and other application interfaces by clients, customers, and vendors, is an increasing challenge to both consumers and those who supply goods or services to users on-line. Sensitive personal information can be information that directly (or indirectly) identifies an individual or entity. Examples of SPI might be names, addresses, dates of birth, social security numbers, and other information that serve to identify an individual.

Businesses and other entities invest substantial resources detecting and encrypting stored SPI to avoid serious issues caused by malicious actors (individual/state sponsored hackers, fraudsters, rogue personnel, etc.) that obtain and use others' SPI, which can lead to significant legal implications and bad publicity when such information is exposed (e.g., whether maliciously or accidentally), damaging a company's reputation and impacting its value.

Many on-line forms require a user or a user identity (e.g., a customer, vendor, client), used interchangeably herewith, to enter SPI into a system associated with the on-line forms. The goal of the form is to obtain one or more pieces of data that is SPI so that a service, or product, can be provided to the client. For example, on-line tax-return software would have to require a user's social security number. In those instances, while still challenging to protect a user's submitted information, at a minimum the company knows that it is soliciting the SPI, obtaining the SPI, and storing the SPI, so they can take proper security measures to protect that SPI.

Unknown storage of unsolicited SPI can result from a user identity entering SPI into fields that were not specifically soliciting SPI. The accidental or unknown submission and storage of information containing SPI can result in the submitted SPI not being encrypted, or not being stored in secured memory locations. This can put a company at legal and business risk, and even result in an increase of exposure of users' SPI. Existing solutions are more focused on reactive SPI scans after SPI has already been stored, or single instance solutions for real-time SPI scans, with different SPI scanning software deployed across several applications, as different teams try to prevent or secure SPI only for their own application. Such solutions are not centralized, lack consistency, and are difficult to update and manage.

The above-described background is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 2 is an example graphical user interface (GUI) comprising a webpage through which a user identity can input text into a field, in accordance with various aspects and embodiments of the subject disclosure.

DETAILED DESCRIPTION

Figure 1:
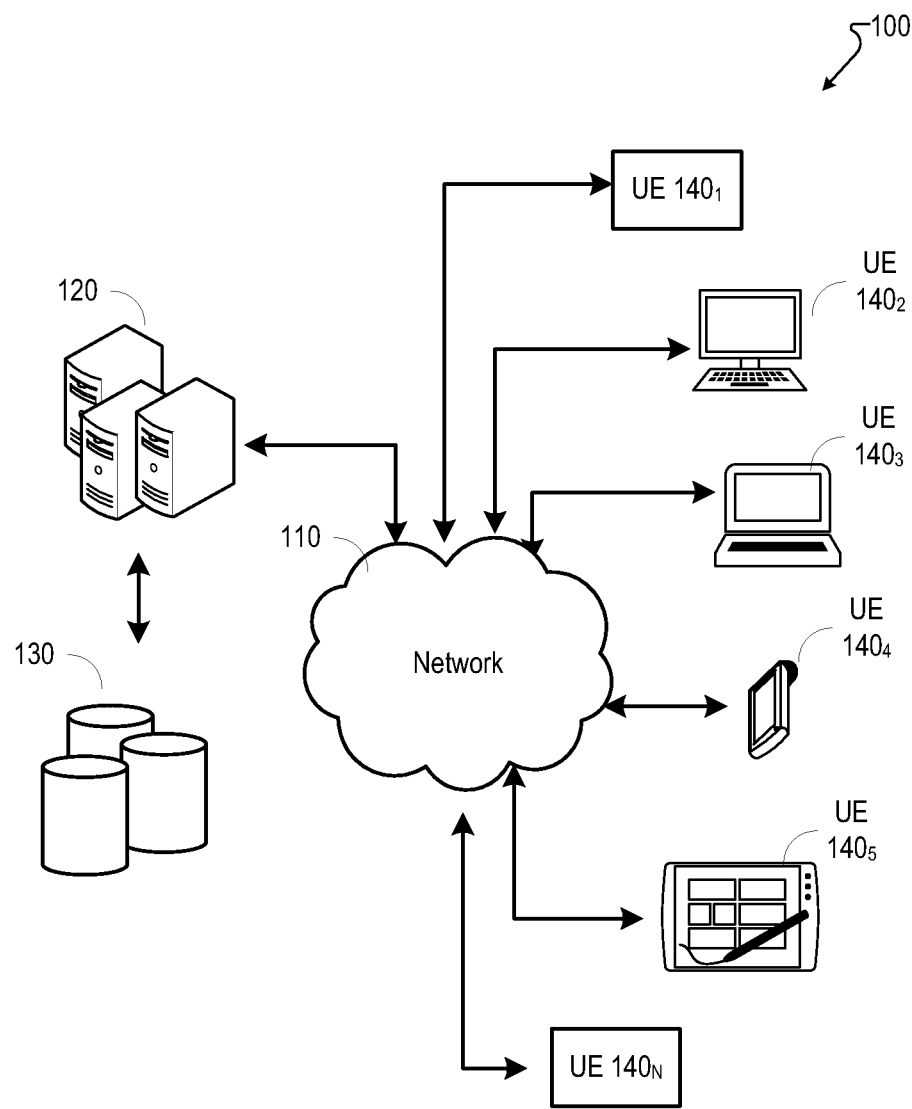
FIG. 1 is a block diagram illustrating an example system and networking environment comprising a business entity server and user equipment, in accordance with, in accordance with various aspects and embodiments of the subject disclosure.

The subject disclosure is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide a more thorough understanding of the subject disclosure. It may be evident, however, that the subject disclosure can be practiced without these specific details. In other instances, structures and devices are shown in block diagram form to facilitate describing the subject disclosure.

The methods and operations (e.g., processes and logic flows) described in this specification can be performed by devices (e.g., network management device, gateway device, etc.) comprising programmable processors that execute machine executable instructions (e.g., computer program product, computer-readable instructions, software, software programs, software applications, software modules, etc.) to facilitate performance of the operations described herein. Examples of such devices can be devices comprising circuitry and components as described in FIG. 11 and FIG. 12.

As mentioned above, accidental and unknown storage of sensitive personal information (SPI) by an entity can turn into a worst-case scenario if a security breach occurs, as it is not known by the entity that SPI is being stored, and further not known what SPI is stored. Because it was not solicited, the entry of SPI might be in clear text (unencrypted), and available to a large audience, or the SPI might not be stored in a secured location.

Most applications aware of accidental SPI storage risk (using chats, web forms, etc.) tend to have their own custom application to scan for and detect SPI that has been submitted and stored. Hundreds of embedded custom SPI detection applications can be in existence, with no common SPI detection algorithms or remediation. Especially if an enterprise has several applications (even dozens, or hundreds) in which users can enter and submit SPI, the costs and resources to maintain unshared, bulky embedded SPI detection code that is customized to address each vulnerability can become significant. Further, because these are all disparate solutions, no common quality or standards are in place to detect SPI and take remedial measures.

The present application describes systems and methods for preventing accidental SPI from ever being stored in an entity's repositories (e.g., a datastore, such as a database or log file). If the SPI is not being stored, this can limit, or eliminate, the exposure of submitted information to would-be hackers and criminals.

In example embodiments, the present application relates to an SPI detection and storage prevention application, that can be run on one or more devices comprising a processor (referred to herein as the "SPI tool" for convenience). The SPI tool can be deployed using a microservices architecture that provides SPI detection via a lightweight (e.g., Representational State Transfer (REST), RESTful application program interface (API), Simple Object Access Protocol (SOAP)) API running in a container orchestration system (e.g., Kubernetes) instantiating software executed in a container (e.g., using Docker). In example embodiments, the SPI code related to the SPI tool runs within a container. This SPI tool can be invoked by a client device (e.g., a user equipment, or a server), which received entry and/or submission of unsolicited SPI. It can be invoked by a client device calling upon the SPI tool using a uniform resource identifier (URI). The SPI tool can then receive potential text, which was entered and/or submitted with SPI, in simple data structure (e.g., JavaScript Object Notation (JSON), Binary JSON (BSON), extensible markup language XML, YAML Ain't Markup Language (YAML), etc.) and the SPI tool can return results comprising simple data structure, wherein the results can identify the type of SPI found, and where the SPI is located (e.g., by line position and length) in the entry/submission field. Thus, in example embodiments, instead of disparate applications each having its own code, algorithms, and structure, the SPI tool implemented using a microservices architecture can eliminate hundreds of custom, bulky, embedded SPI scanning applications by providing a single microservice URI that can be invoked with a few lines of code. This can facilitate the elimination or significant reduction of inconsistent SPI scanning applications, costs in maintaining home grown solutions, and constant client updates.

In example embodiments, the SPI tool can be updated on-the-fly via a configurable map (e.g., regex string) located in an orchestration system. The configurable map can be updated to include additional types of SPI (e.g., driver's licenses, etc.) as they are identified, so as to identify more types of SPI or improve existing algorithms (Luhn algorithm for credit cards), as will be described further below.

FIG. 1 is a diagram illustrating an example of system 100 in comprising a communications network (e.g., network 110) in which one or more servers associated with a product or service provider (referred to herein as "business entity server 120") communicates with one or more user identities (e.g., customers, clients, vendors, etc.) operating UEs 140$_{1-N}$ (referred to as UE 140 in the singular, wherein UE 140 can be any one of the UEs 140$_{1-N}$). Client devices can comprise both UEs as well as servers. The business entity server 120 can store information it receives from UEs 140$_{1-N}$ into one or more data stores 130 (which may contain one or more databases of information).

The network 110 may include any of a variety of types of wired or wireless computer networks such as the Internet, a private intranet, a public switched telephone network (PSTN), cellular network, satellite network, data over cable network (e.g., operating under one or more data over cable service interface specification "DOCSIS"), or any other type of computer or communications network. The communications networks can also comprise, for example, a Local Area Network (LAN), such as an office or Wi-Fi network, which can be accessed via a Wi-Fi access point (WAP).

The business entity server 120 can be operable to provide for an on-line system that allows a user identity to access on-line services and purchase products via UEs 140$_{1-N}$. On-line services and products can be of any type, such as, for example, academic services (e.g., on-line registration for classes, submission of assignments, on-line exams, etc.), financial services (e.g., bill payment for utilities, on-line banking, sale and purchasing of commodities, etc.), consumer products (e.g., merchant identities selling merchandise on-line, on-line auction sites), travel services, government services, on-line gaming services, etc. Business entity server 120 can also provide a webpage through which a customer can chat with a representative, or fill out an on-line form.

UEs 140$_{1-N}$ can comprise, for example, a tablet computer, a desktop computer, or laptop computer, a cellular enabled laptop (e.g., comprising a broadband adapter), a handheld computing device, a mobile phone, a smartphone, a tablet computer, a wearable device, a virtual reality (VR) device, a heads-up display (HUD) device, and the like. Modules comprising executable instructions that, when executed by a processor of a UE 140, facilitate performance of operations, can be stored on a memory device of the UE 140 (or a memory device connected to the UE 140).

In example embodiments, a user equipment (e.g., UE 140) can access and communicate, through the network 110, with the business entity server 120. The business entity server 120 can send, via network 110, executable code capable of generating graphical user interfaces (GUIs), such as a webpage, that a user identity can interact with to facilitate the provision of on-line products and services. The business entity server 120 can be said to "serve up" a webpage via the network 110. The UEs 140$_{1-N}$ can display the webpage to a user.

The business entity server 120 and user equipment 140$_{1-N}$ can execute software modules that can facilitate various functions, methods, and processes. Business entity server 120, data stores 130, and UE 140, may be physically located in (or in the case of mobile devices, can be temporarily present in) a central location, or in separate facilities. The data stores can comprise physical media housed within the one or more business entity server 120, or connected to the business entity server 120 through one or more networks. In example embodiments, the network 110 facilitates communication between the server(s) 120, data store(s) 130, and UE 140.

FIG. 2 illustrates an example of a graphical user interface (GUI) comprising a webpage 200 served up by business entity server 120. The webpage can be served up and displayed on a UE (e.g., UE 140) operated by a user identity (e.g., a customer, client, or vender). The webpage 200 shows an example of a help webpage through which the user identity can obtain assistance (e.g., assistance regarding a product or service sold or provided by the business entity). Some of the fields have prompts associated with them prompting a user to enter specific information, which may or may not be SPI. For example, the name field 205 can have an indicator (or prompt) to a user that this is where the user enters his or her name. The email address field 210 can have an indicator (or prompt) to the user that this is where the user enters his or her email address. The phone field 315 can have an indicator to the user that this is where the user enters his or her phone number. Comment field 220 can be a field for the user to enter any additional comments the user may have that has not been prompted for already. Typically, the information entered into a comment field can include a description of a problem, why the user is contacting the help department, previous encounters with the help department, etc. When the user is finished entering the information into the comment field 220, the user can submit the information (e.g., by clicking on a submit button 225).

Because a typical comment field (e.g., comment field 220) might not provide any guidance as to the type of information that can be entered by a user, sometimes a user might provide SPI (e.g., social security number, credit card number, etc.)), even when that information was not prompted for, or solicited. In other scenarios, GUIs associated with the business entities support forum (e.g., accessible in the example webpage 200 by selecting the support forum link 230), an order form (e.g., accessible in the example webpage 200 by selecting the get products link 235), and a live agent (e.g., accessible in the example webpage 200 by selecting the talk live link 24) can all present one or more fields for entering information. For example, a chat window might be used to send information back and force between the user and on-line agent. Typically, the chat sessions are manned by a bot, and before bringing an agent into the chat session, first asks the user to provide information on what the problem is. This chat window can be an entry point for unsolicited SPI. The SPI when entered and submitted can be sent through network (e.g., the internal to a server owned or operated by the service or product provider entity (e.g., business entity server 120). The server can then store the SPI in a database or repository associated with comments (or in the case of a chat with an agent, a chat log). Because the SPI was unsolicited, the SPI would be stored unknowingly, potentially in a less secure fashion (e.g., unencrypted), and in a less secure location.

Figure 3:
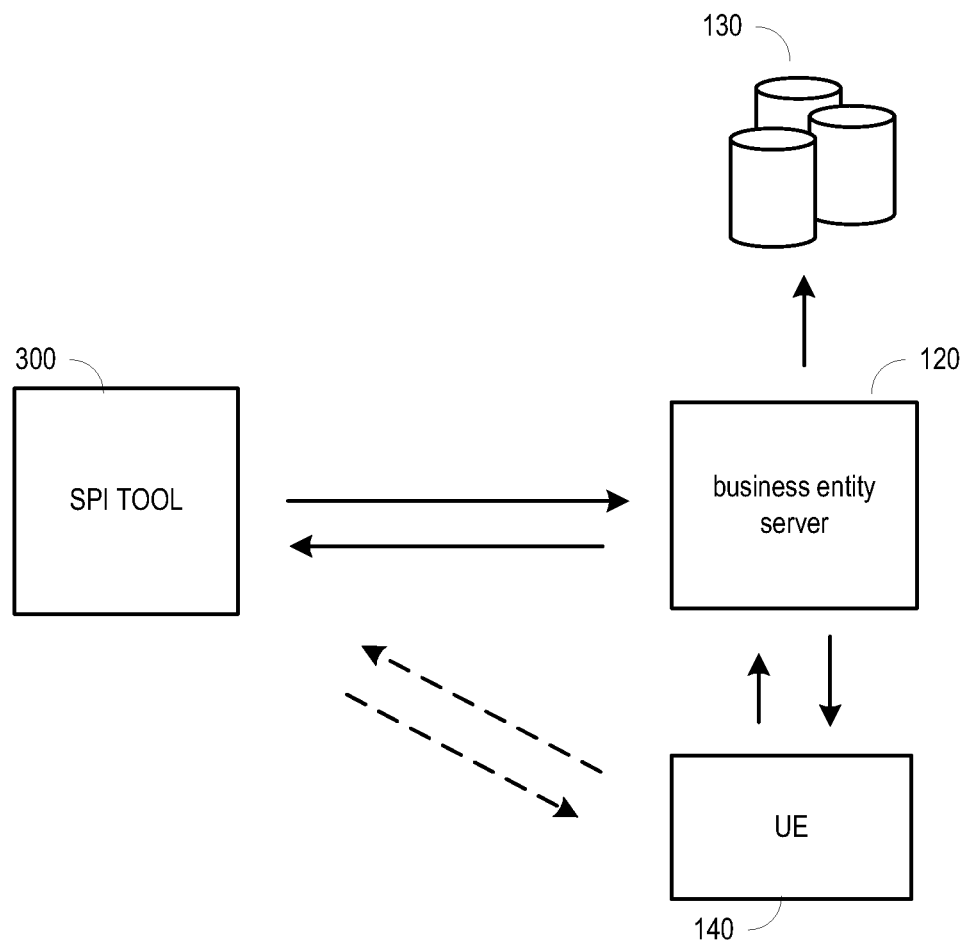
FIG. 3 illustrates a block diagram depicting a sensitive personal information detection and storage prevention tool (SPI tool), in accordance with various aspects and embodiments of the subject disclosure.

FIG. 3 is a block diagram illustrating an example embodiment of an SPI tool 300, in accordance with the present application. The SPI tool 300 can receive a user's entered (or submitted) information (e.g., comments submitted through comment field 220), either from the business entity server 120, or from the UE 140 (e.g., indicated by the dotted line). In the example embodiments in which the business entity server 120 invokes the SPI tool 300, the information might be submitted to the business entity server 120, and prior to any storage of this information, the business entity server 120 can invoke the SPI tool 300. The SPI tool 300 can process the received information and determine whether the user's entered or submitted information contains SPI. It can then return this result to, for example, a prevention module operating either on the business entity server 120, or on the UE 140. This process, and variations of it, will be further explained below.

Figure 4:
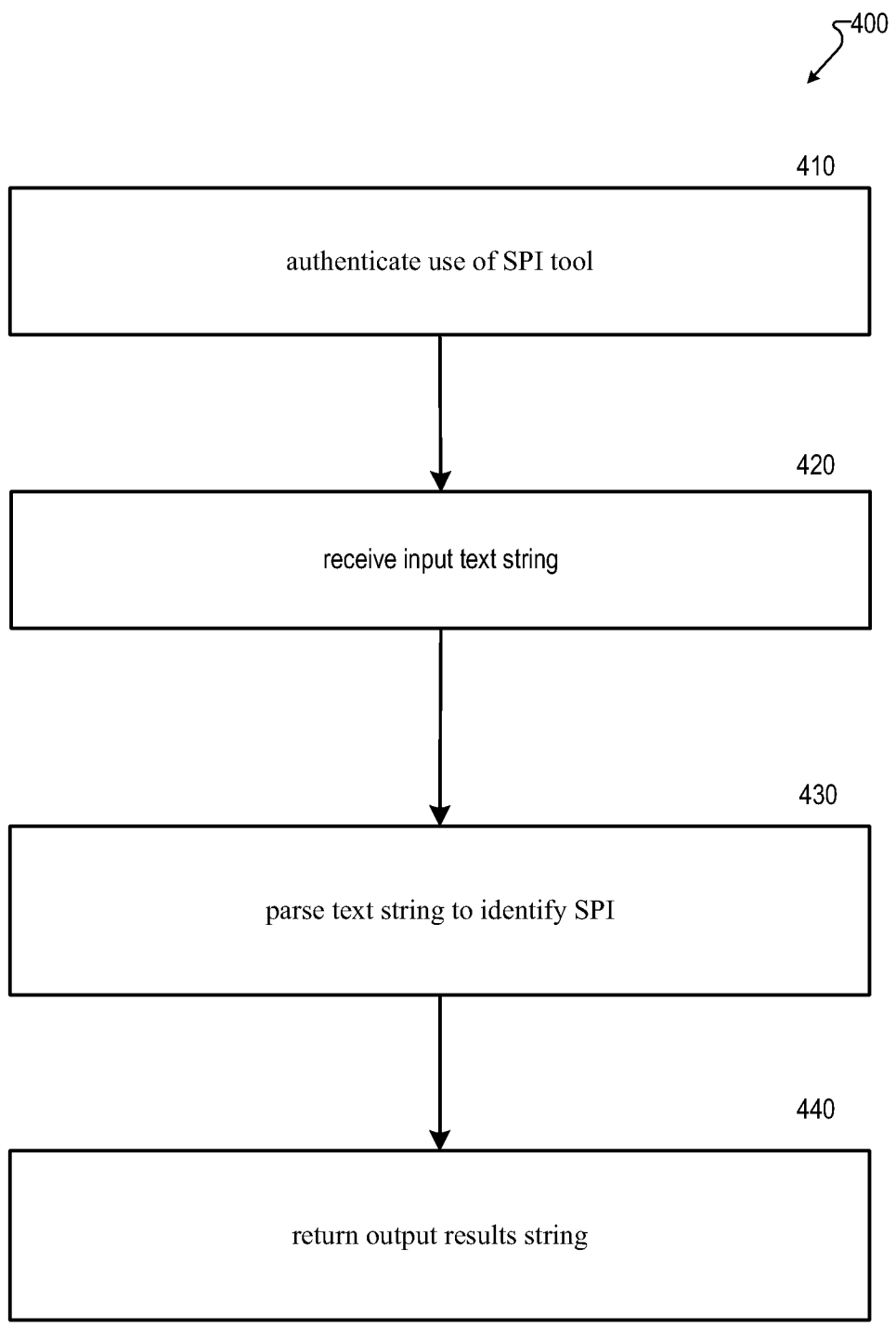
FIG. 4 illustrate example operations that can be performed by the SPI tool, in accordance with various aspects and embodiments of the subject disclosure.

FIG. 4 is a block diagram illustrating operations 400 related to an example embodiment of an SPI tool 300 in accordance with the present application. The SPI tool 300 can, in some example embodiments, run as a servlet on a client device (e.g., UE 140, business entity server 120). In other example embodiments, the SPI tool can run on a server device associated with an SPI microservice orchestration system (e.g., SPI microservice orchestration system 720 below). The SPI tool can parse strings that the SPI tool receives via a network (e.g., network 110) from a UE 140, or, in some example embodiments, from the business entity server 120, prior to storage.

In example embodiments, when a user identity enters information into a comment or chat field (e.g., comment field 220 of webpage 200), a client module on the UE 140 can invoke the SPI tool 300 of the present application. The SPI tool 300 can, at block 410, authenticate the use of the SPI tool 300 by the business entity (e.g., the business entity server 120, or the UE 140 running the webpage served up by the business entity server 120, that invokes the software). Again, the authentication operation can be used for determining whether the business entity is authorized to use the SPI tool 300. Various authentication methods can be used, including determining whether the invoking device is associated with a domain related to the business entity, or credentials that are, for example, automatically submitted to the SPI tool 300.

In response to the SPI tool verifying that the business entity is authorized to use the SPI tool, the SPI tool can then, at block 420, receive an input of text string. The text string can be from the submission of information by the user entering and submitting information into the comment field 220, for example. In example embodiments, the SPI tool can receive the input string as the user is entering information into a field. In other example embodiments, the SPI tool can receive the input string, which might or might not contain SPI, after a user has entered and submitted the information (e.g., after selecting the submit button 225), but prior to storage of the SPI by the business entity server 120. The SPI tool can receive the text that was entered and/or submitted with SPI in simple data structure (e.g., JSON, BSON, XML, YAML, etc.). In example embodiments, the string can be received either from the UE 140 (e.g., SPI tool 300 invoked by the UE 140), or in other example embodiments, by the business entity server 120 (e.g., SPI tool 300 invoked by the business entity server 120).

At block 430, the SPI tool can parse the received text string to detect the string for SPI. The SPI tool can, in example embodiments, use a combination of regular expressions (regex) to detect SPI. The SPI tool can also apply contextual logic that looks for keywords, such as "my birthday is . . ." and operates under the assumption that what follows is a birthday.

At block 440, the results of the SPI tool's analysis can be output. In example embodiments, the SPI tool can return simple data structure (e.g., JSON, BSON, XML, YAML, etc.) that identifies the type of SPI found, and where the SPI is located (e.g., by line position and length) in the entry/submission field (referred to herein for convenience as "returned SPI data").

The SPI tool 300, in example embodiments, also comprise a prevention module, which can be run on the SPI tool's server side, or as an application on the client side (e.g., on the UE's device), or as an application on the product and service provider's server.

Figure 5:
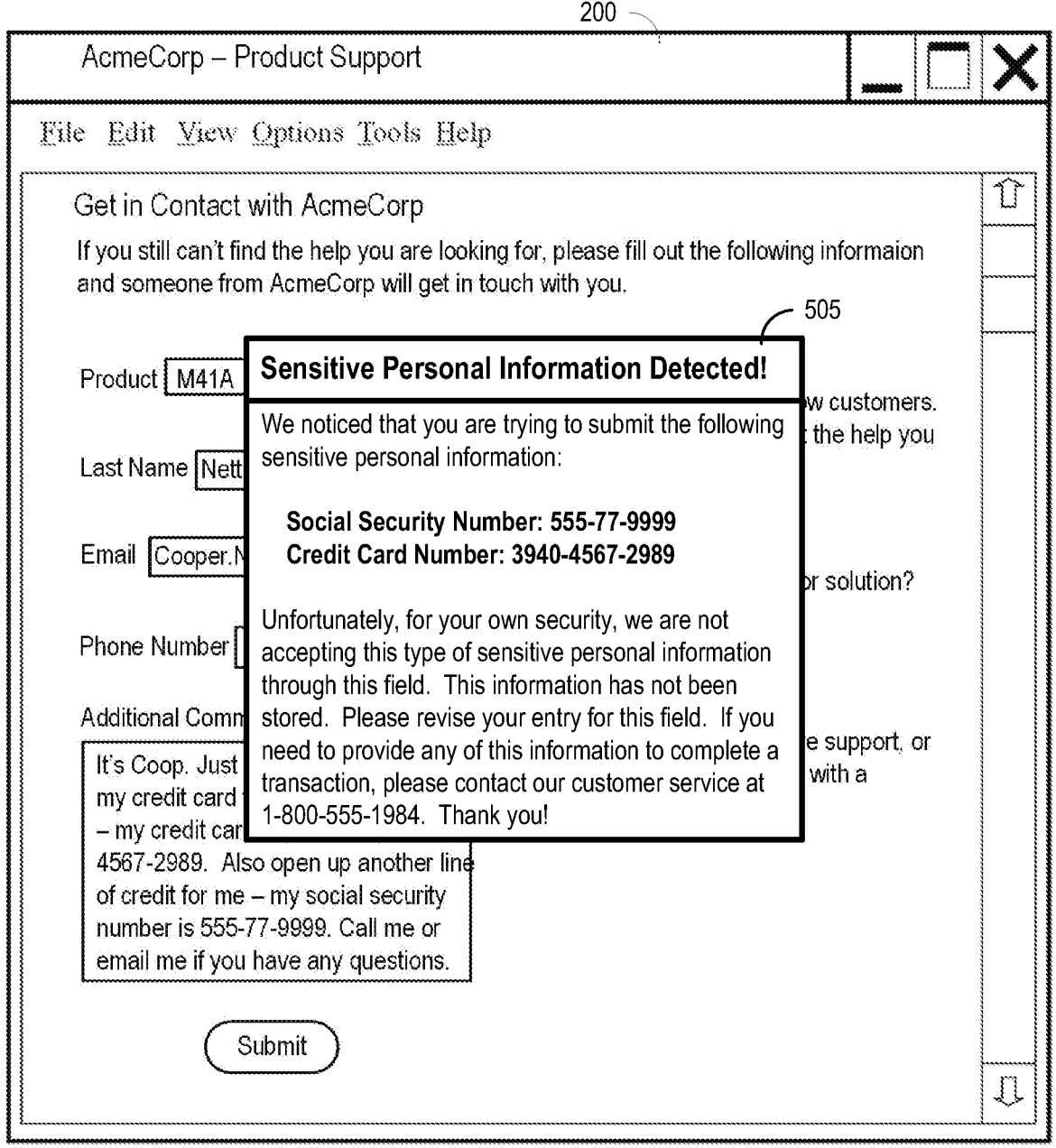
FIG. 5 illustrates an example GUI providing an alert message, in accordance with various aspects and embodiments of the subject disclosure.

Referring now to FIG. 5, in example embodiments, the SPI tool transmits the returned SPI data to the prevention module (again, the prevention module be running on the business entity server 120, or on the UE 140), which can facilitate the display on the user equipment an alert message 505 (e.g., can appear on a browser page) indicating that the user is attempting to enter into the field (e.g., comment field 220) unsolicited SPI. If the prevention module is run on the business entity server 120, the alert message can be served up to the UE 140 for display on the webpage 200. If the prevention module is run on the UE 140, the UE 140 can likewise execute the prevention module, which facilitates the display of the message on the webpage 200. The alert message 505 can inform the user that the business entity's system is not accepting SPI, and ask the user to either re-enter or re-submit his or her comments (information) into the field without the identified SPI. After the user has revised and resubmitted the information into the comment field, the SPI tool can again parse the re-entered or re-submitted text. This iteration, if there is no SPI information, the information submitted by the user can be either passed by the SPI tool 300 to the business entity server 120 for storage into the business entity's system (e.g., data stored 130). In alternative embodiments, the business entity server 120 can retain a copy of the user's submission until it receives a confirmation message from the SPI tool that the user's submission contains no SPI. If the server does not hear back within a set period of time, it can discard the submission, working under the assumption that SPI has been found by the SPI tool 300, and that revised text without SPI shall be submitted later by the user.

Figure 6:
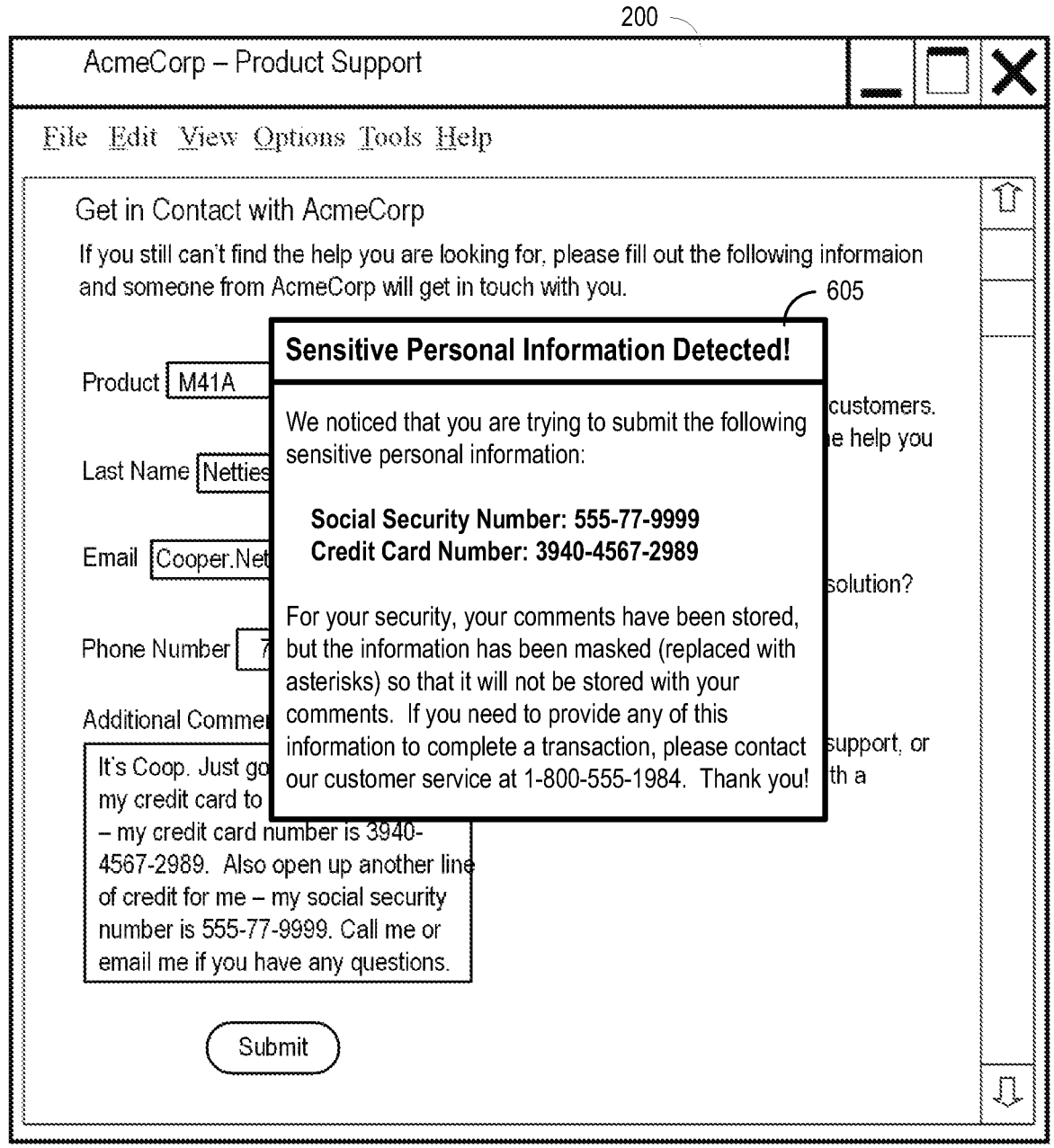
FIG. 6 illustrates an example GUI providing a notification message, in accordance with various aspects and embodiments of the subject disclosure.

Moving on to FIG. 6, in alternative, or additional, example embodiments, if the SPI tool 300 at block 430 has identified SPI in the user's entered or submitted text string, the SPI tool 300 can mask the SPI (e.g., replace the SPI with asterisks), or filter out the SPI from the text string. The SPI tool 300 can then send the sanitized text string to the business entity server 120 for storage into its data stores 130 (e.g., wherever it keeps user commends submitted through comment field 220). The SPI tool can facilitate the sending of a notification message 605 for display on the UE 140 (e.g., directly to the UE 140, or via the business entity server 120). The notification message 605 can notify the user that he or she has attempted to submit SPI, but that the SPI has been masked (or, excluded) prior to storage of the submission. The message can also display to the user what his or her submitted information now looks like, after the SPI has been masked (or, excluded). The notification can serve to facilitate remembrance by the user identity that his or her information has not been stored into the business entity's system, so that in the event of a security breach (e.g., hack) of the business entity's system, the user identity need not be alarmed, as his or her information was never entered into the business entity's system (e.g., data stores).

In alternative, or additional, example embodiments, the text string can be returned to the prevention module (which, in various example embodiments, as mentioned above, can be run on the business entity server 120, or can be run in the UE 140). The prevention module masks/filters submitted text before transmitting it to business entity server 120 for storage. In example embodiments, the SPI tool 300, or the prevention module, can facilitate the sending and display of the notification message 605 on the UE 140.

Figure 7:
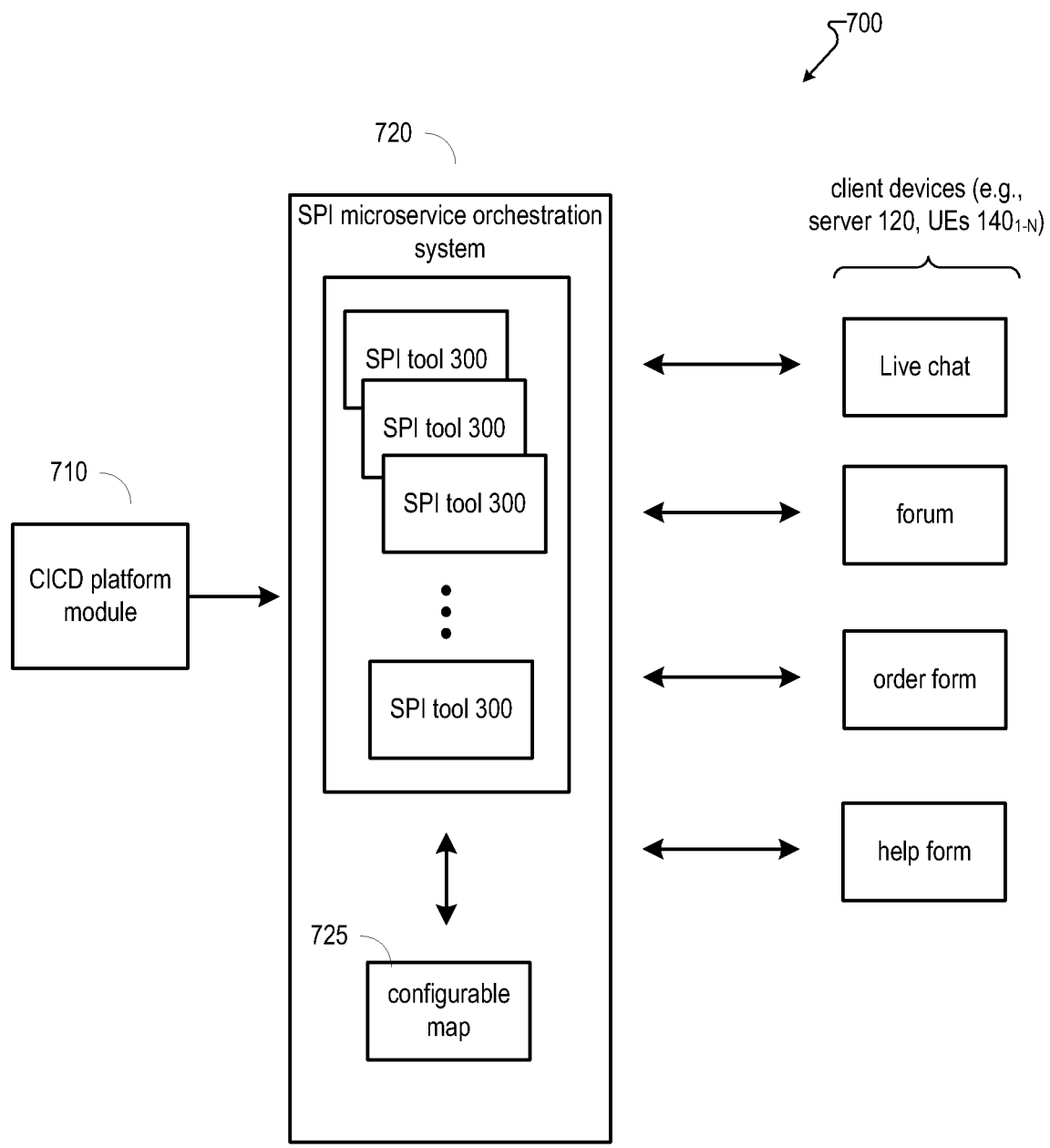
FIG. 7 illustrates an example system comprising a continuous integration/continuous deployment (CICD) component and a microservice orchestration system, in accordance with various aspects and embodiments of the subject disclosure.

FIG. 7 depicts a block diagram that illustrates an example embodiment of a system 700 that can be used to create, provision, and execute the SPI tool 300 of the present application. The SPI tool 300 can be created in a microservice environment, whereby one or more instances of the SPI tool 300 can be executed in containers. The system 700 can comprise one or more modules, each of which can comprise software code that, when executed by a computing device, perform operations as described in this application.

The system 700 can comprise continuous integration/continuous deployment (CICD) component (e.g., computer executing software). The CICD can comprise a microservice configuration tool that can be used to (e.g., by a computer programmer, coder, etc.) to configure and create the SPI tool 300 to be deployed and run in a microservices architecture. The CICD can provide for code templates (e.g., a java-based microservice template), allow the SPI tool 300 to be written (or modified), and inspect the code, compile it, and push it to the microservices orchestration system.

The SPI microservice orchestration system 720 can comprise a container orchestration system (e.g., Kubernetes) running the SPI tool 300 in a container (e.g., Docker). The SPI tool 300 runs within the container. As mentioned above, a client (e.g., UE 140, business entity server 120) can invoke the SPI tool 300, to perform the operations as described in this application. The SPI microservice orchestration system 720 can comprise one or more computers. Each container can be instantiated in response to increases in demand for the operations performed by the SPI tool 300 (e.g., when there are multitudes of submissions of text strings, thereby leading to the invocation of multiple instances of the SPI tool 300).

In example embodiments, the SPI microservice orchestration system can also comprise a configurable map 725 (e.g., regex string). The configurable map is queried (or consulted) by the SPI tool 300 and defines what information is categorized as SPI. The configurable map can be updated to include additional types of SPI (e.g., driver's licenses, etc.) as they are identified to identify more types of SPI, or improve existing algorithms (Luhn algorithm for credit cards). The configurable map allows more types of SPI to be include as part of the SPI tool's parsing analysis (e.g., block 430) without going through the CICD process to change the SPI tool 300.

In non-limiting embodiments, the SPI tool (e.g., SPI tool 300, one or more devices executing the SPI tool 300) can comprise a processor and a machine-readable storage medium (e.g., memory) that stores executable instructions that, when executed by the processor, facilitate performance of operations as illustrated in flow diagrams 8-10. The system can comprise a microservice orchestration device(s) that executes more than one instances of the SPI tool 300 (e.g., SPI microservice orchestration system 720). In each of the example operations described above, and below in FIGS. 8-10, steps, blocks, features, or aspects can be substituted or combined with other steps, blocks, features, or aspects, unless context warrants that such combinations or substitutions are not possible. Further, if a step, block, feature, or aspect is not described with respect to example operations, this does not mean that the feature, step, or aspect is incompatible or impossible with respect to those example operations. As such, the example operations of the present application described above and below are not necessarily limited to the steps, features, or aspects that are described with respect to those example operations.

Figure 8:
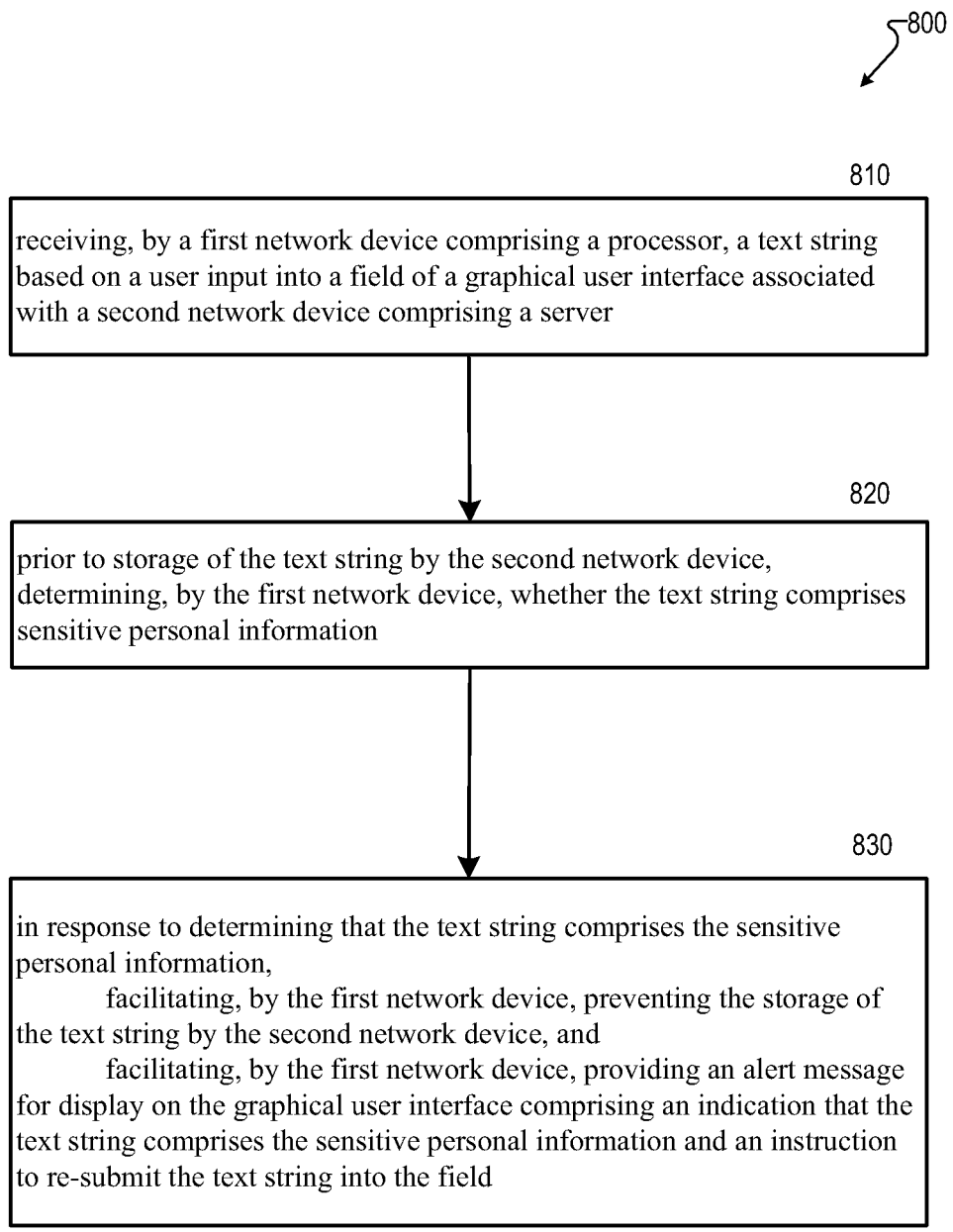
FIG. 8 illustrates example operations that can be performed by the SPI tool, in accordance with various aspects and embodiments of the subject disclosure.

Referring to FIG. 8, example operations 800 can comprise, at block 810, receiving a text string (e.g., a text spring comprising alphanumeric characters) based on a user input into a field (e.g., comment field 220) of a graphical user interface (e.g., webpage 200) associated with a server (e.g., business entity server 120). The user input into the field can comprises entry of the text string into the field prior to submission of the user input to the server.

The example operations 800 can also comprise, at block 820, prior to storage of the text string by the second network device, determining whether the text string comprises sensitive personal information (e.g., a social security number, a credit card number, etc.). Determining whether the text string comprises sensitive personal information can occur prior to receipt of the text string by the second network device. Determining whether the text string comprises the sensitive personal information further can comprise parsing the text string to identify the sensitive personal information.

At block 830, the example operations 800 can comprise, in response to determining that the text string comprises the sensitive personal information, facilitating preventing the storage of the text string by the second network device, and facilitating, by the first network device, providing an alert message (e.g., alert message 505) for display on the graphical user interface comprising an indication that the text string comprises the sensitive personal information and an instruction to re-submit the text string into the field.

In the example operations 800, the text string can be a first text string, and the example operations can further comprise receiving a subsequent submission of a second text string. The second text string would be determined not to comprise the sensitive personal information, if the resubmission did not contain any sensitive personal information.

In example embodiments, a submitted text string can be held by the SPI tool until it is determined that there is no SPI being submitted. After it is determined that there is no SPI in the text string, the text string can be sent to the server for storage. In example embodiments, the text string can also be held by the server until it receives a notification from the SPI tool that the text string comprises no sensitive personal information.

In example embodiments, in response to determining that the text string does not comprise the sensitive personal information, the example operations 800 can further comprise, facilitating providing a notification message for display indicating that the text string does not comprise the sensitive personal information.

In example embodiments, the determining whether the text string comprises the sensitive personal information can comprise referring to a configurable map (e.g., configurable map 725) indicating a type of the sensitive personal information. The configurable map can be updated with a second type of the sensitive personal information.

Figure 9:
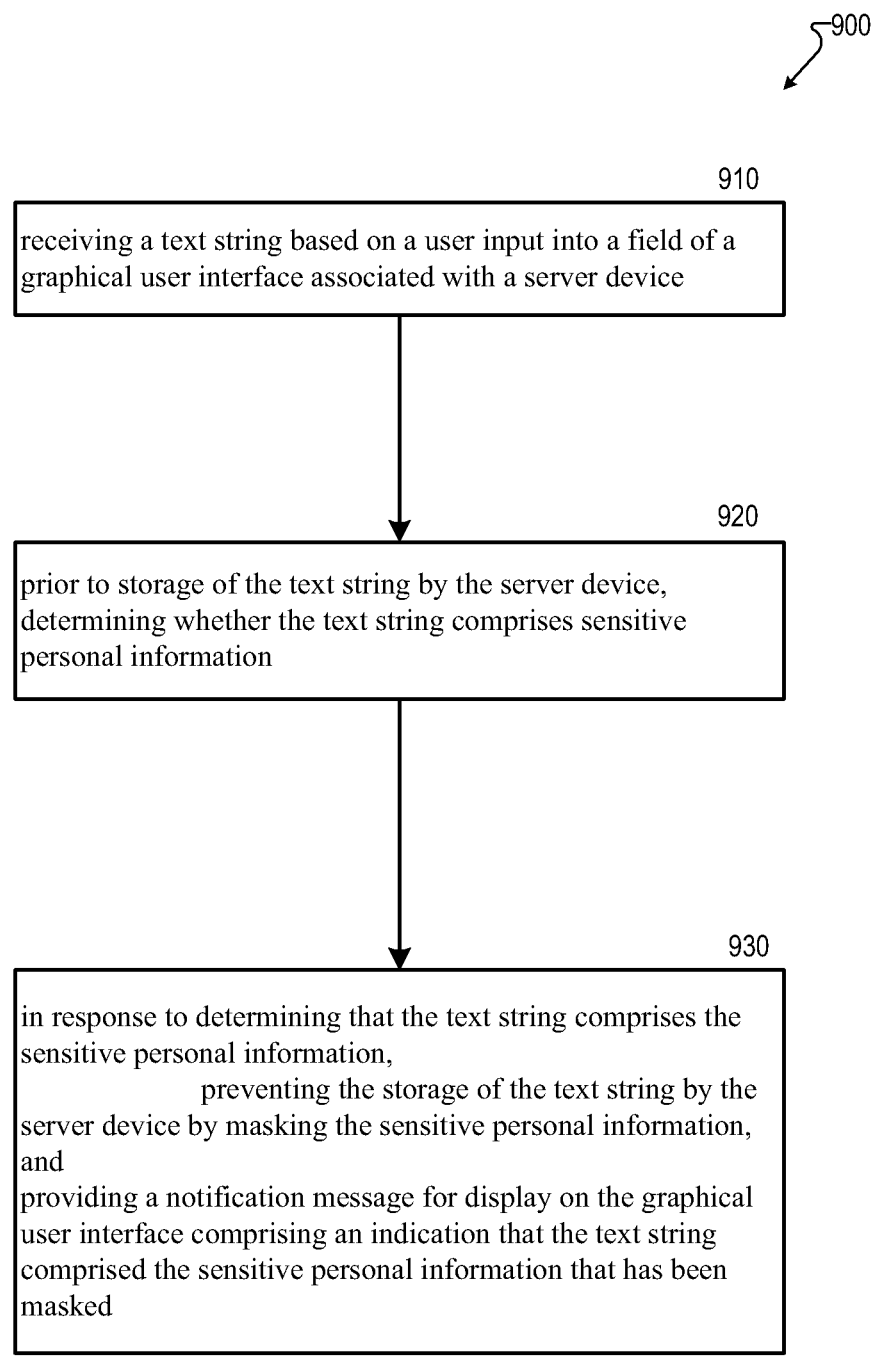
FIG. 9 also illustrates example operations that can be performed by the SPI tool, in accordance with various aspects and embodiments of the subject disclosure.

FIG. 9 illustrates further example operations 900, which can, at block 910, be performed by the SPI tool (SPI tool 300, or one or more devices executing SPI tool 300), can comprise receiving a text string based on a user input into a field (e.g., comment field 220) of a graphical user interface (e.g., webpage 200) associated with a server device (business entity server 120). The user input into the field can comprise entry of the text string into the field prior to submission (e.g., before the user clicks on the submit button 225) of the user input to the server device.

At block 920, the example operations can comprise, prior to storage of the text string by the server device, determining whether the text string comprises sensitive personal information. The determining whether the text string comprises the sensitive personal information can occur prior to receipt of the text string by the server device. The determining whether the text string comprises the sensitive personal information can further comprise parsing the text string to identify the sensitive personal information. The determining whether the text string can comprise the sensitive personal information comprises referring to a configurable map indicating a type of the sensitive personal information. The configurable map can be updated with a second type of the sensitive personal information.

At block 930, the example operations can comprise, in response to determining that the text string comprises the sensitive personal information, preventing the storage of the text string by the server device by masking the sensitive personal information, and providing a notification message for display on the graphical user interface comprising an indication that the text string comprised the sensitive personal information that has been masked.

The example operations 900 can further comprise transmitting the text string after the sensitive personal information has been masked, to the server device for storage.

Figure 10:
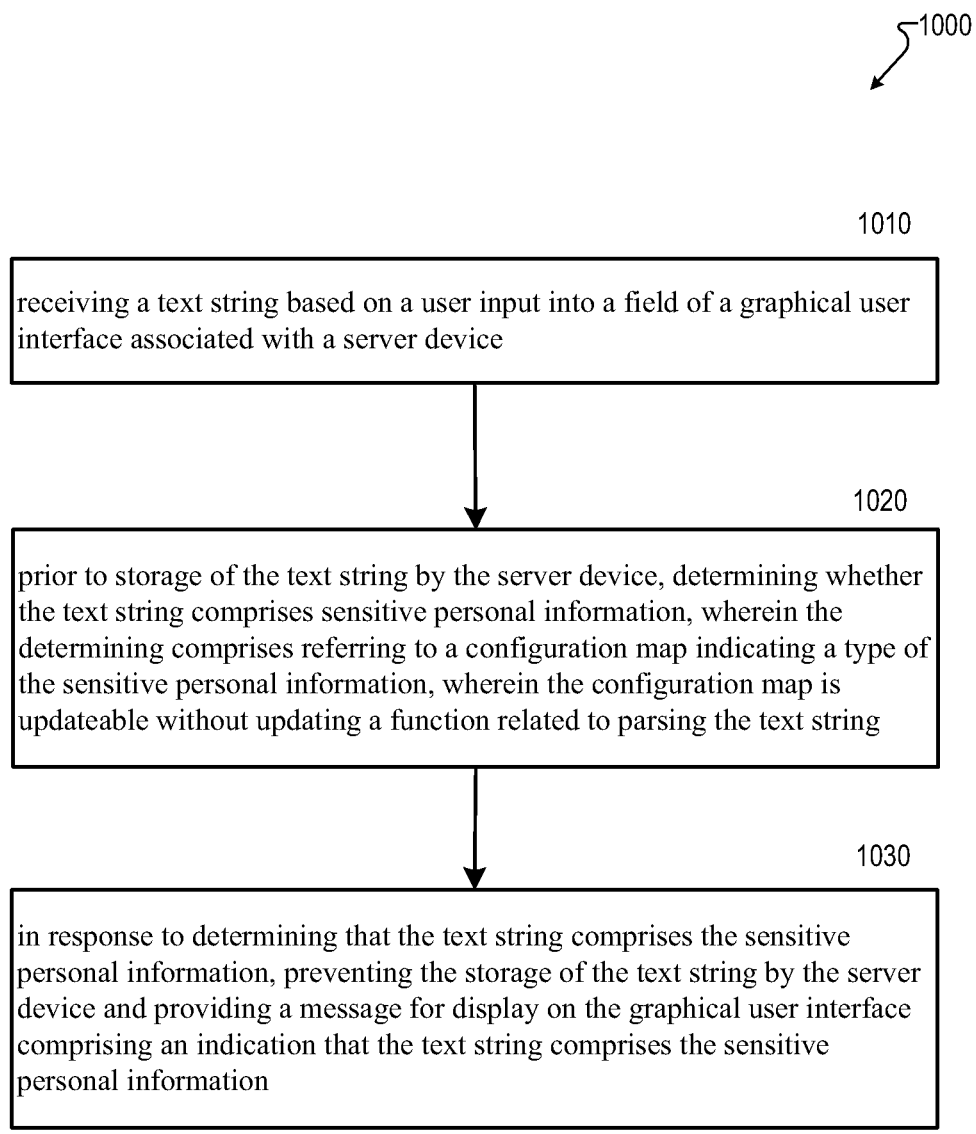
FIG. 10 is another illustration depicting example operations that can be performed by the SPI tool, in accordance with various aspects and embodiments of the subject disclosure.

FIG. 10 illustrates example operations 1000 that can be performed by the SPI tool. The example operations 1000 can, at block 1010, comprise receiving a text string based on a user input into a field (e.g., comment field 220) of a graphical user interface (e.g., webpage 200) associated with a server device (e.g., business entity server 120).

The example operations 1000 can, at block 1020, can comprise, prior to storage of the text string by the server device, determining whether the text string comprises sensitive personal information, wherein the determining comprises referring to a configurable map (e.g., configurable map 725) indicating a type of the sensitive personal information, wherein the configurable map is updateable without updating a function related to parsing the text string.

Th example operations 1000 can, at block 1030, comprise, in response to determining that the text string comprises the sensitive personal information, preventing the storage of the text string by the server device and providing a message for display on the graphical user interface comprising an indication that the text string comprises the sensitive personal information. The message can further comprise an instruction to re-submit the text string without the sensitive personal information (e.g., alert message 505). The message can further comprise a notification that the sensitive personal information has been masked (e.g., notification message 605).

Figure 11:
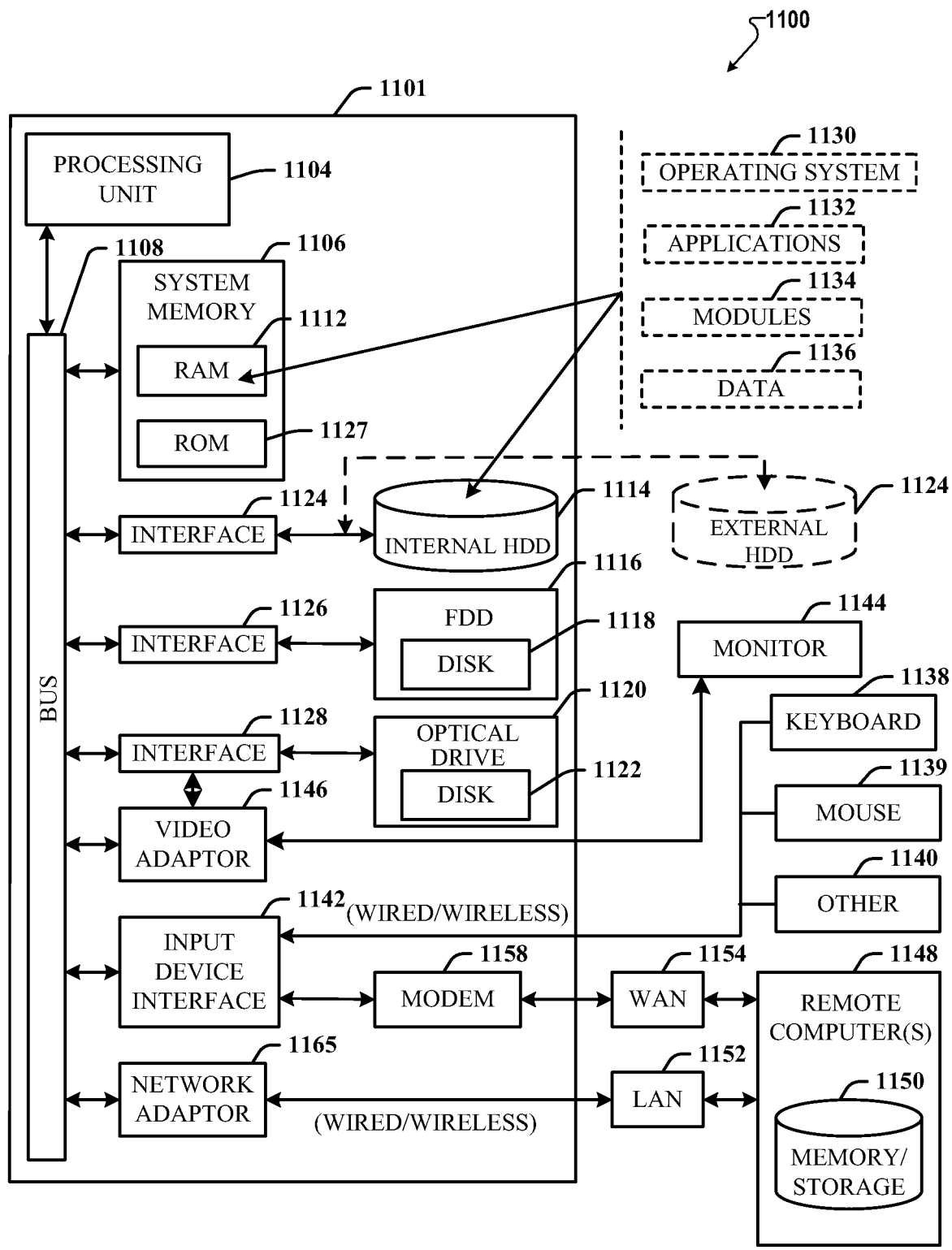
FIG. 11 illustrates an example block diagram of a computer that can be operable to execute processes and methods in accordance with various aspects and embodiments of the subject disclosure.

Referring now to FIG. 11, there is illustrated a block diagram of a computer 1100 operable to execute the functions and operations performed in the described example embodiments. For example, a user device (e.g., UE 140) or servers (e.g., business entity server 120, or any device(s) executing the SPI tool 300) can contain components as described in FIG. 11. The computer 1100 can provide networking and communication capabilities between a wired or wireless communication network and a server and/or communication device. In order to provide additional context for various aspects thereof, FIG. 11 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory data stores.

Computing devices typically include a variety of media, which can include computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic data stores, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 11, the computer 1100 can comprise a processing unit 1104, a system memory 1106 and a system bus 1108. The system bus 1108 couples system components comprising the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 comprises read-only memory (ROM) 1127 and random access memory (RAM) 1112. A basic input/output system (BIOS) is stored in a non-volatile memory 1127 such as ROM, EPROM, EEPROM, which BIOS contains the basic routines that help to transfer information between elements within the computer 1100, such as during start-up. The RAM 1112 can also include a high-speed RAM such as static RAM for caching data.

The computer 1100 further comprises an internal hard disk drive (HDD) 1114 (e.g., EIDE, SATA), which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations comprises at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1100 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1100, such as zip drives, magnetic cassettes, flash memory cards, cartridges, and the like, can also be used in the example operating environment, and further, that any such media can contain computer-executable instructions for performing the methods of the disclosed innovation.

A number of program modules can be stored in the drives and RAM 1112, comprising an operating system 1130, one or more application programs 1132, other program modules 1134 and program data 1136. All or portions of the operating system, applications, modules, and/or data can also be cached in the RAM 1112. It is to be appreciated that the innovation can be implemented with various commercially available operating systems or combinations of operating systems.

A user can enter commands and information into the computer 1100 through one or more wired/wireless input devices, e.g., a keyboard 1138 and a pointing device, such as a mouse 1139. Other input devices 1140 (not shown) can include a microphone, camera, an IR remote control, a joystick, a game pad, a stylus pen, touch screen, biometric reader (e.g., fingerprint reader, retinal scanner, iris scanner, hand geometry reader, etc.), or the like. These and other input devices are often connected to the processing unit 1104 through an input device interface 1142 that is coupled to the system bus 1108, but can be connected by other interfaces, such as a parallel port, an IEEE 2394 serial port, a game port, a USB port, an IR interface, etc.

A monitor 1144 or other type of display device can also be connected to the system bus 1108 through an interface, such as a video adapter 1146. In addition to the monitor 1144, a computer 1100 typically comprises other peripheral output devices (not shown), such as speakers, printers, etc.

The computer 1100 can operate in a networked environment using logical connections by wired and/or wireless communications to one or more remote computers, such as a remote computer(s) 1148. The remote computer(s) 1148 can be a workstation, a server computer, a router, a personal computer, portable computer, microprocessor-based entertainment device, a peer device or other common network node, and typically comprises many or all of the elements described relative to the computer, although, for purposes of brevity, only a memory/data store 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1100 is connected to the local network 1152 through a wired and/or wireless communication network interface or adapter 1156. The adapter 1156 can facilitate wired or wireless communication to the LAN 1152, which can also include a wireless access point disposed thereon for communicating with the wireless adapter 1156.

When used in a WAN networking environment, the computer 1100 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 through the input device interface 1142. In a networked environment, program modules depicted relative to the computer, or portions thereof, can be stored in the remote memory/data store 1150. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

Figure 12:
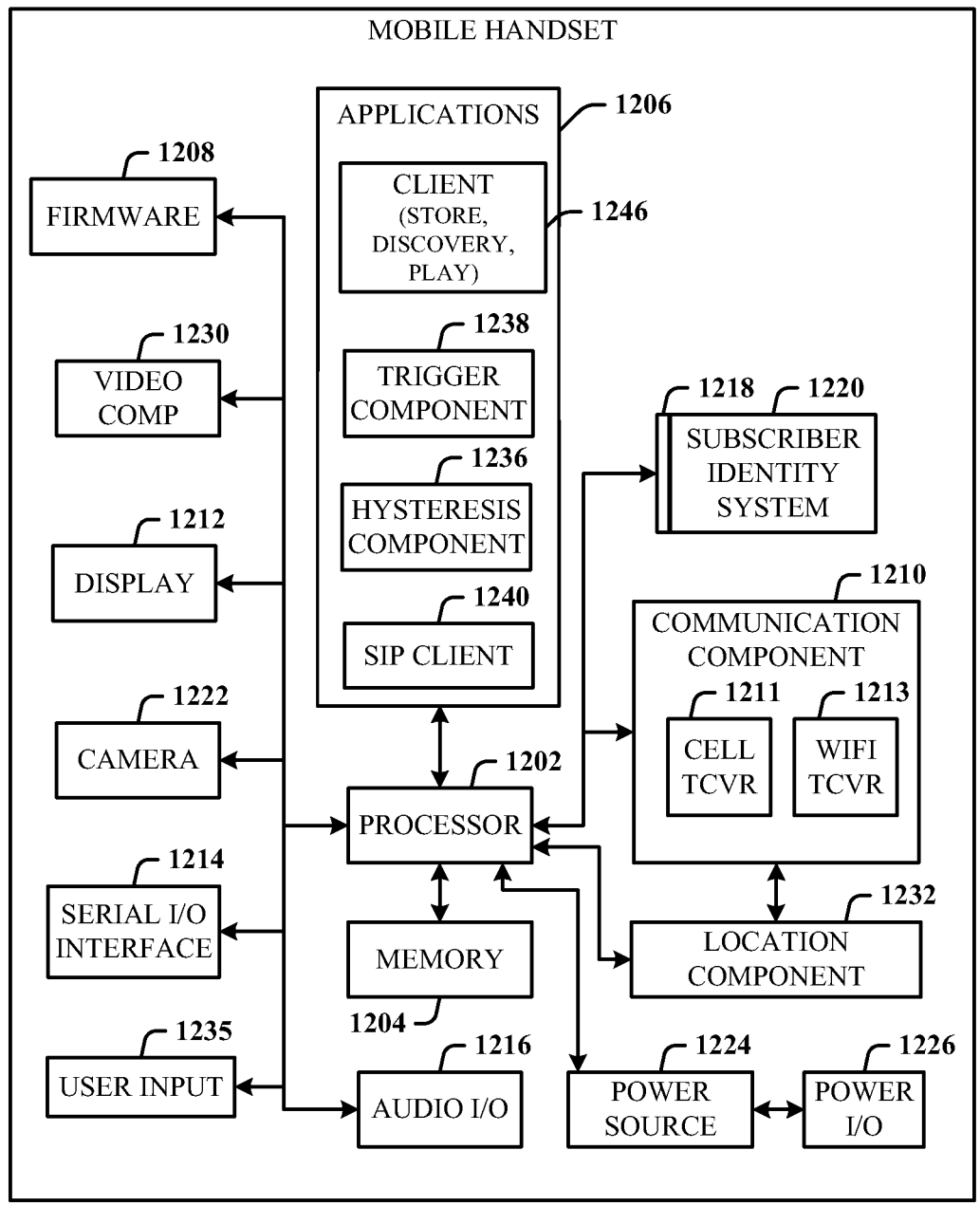
FIG. 12 illustrates an example block diagram of a mobile handset that can be operable to execute processes and methods in accordance with various aspects and embodiments of the subject disclosure.

Referring now to FIG. 12, illustrated is a schematic block diagram of a mobile device 1200 (e.g., UE 140 can be a mobile device 1200) capable of connecting to a network in accordance with some embodiments described herein. Although a mobile handset 1200 is illustrated herein, it will be understood that other devices can be a mobile device, and that the mobile handset 1200 is merely illustrated to provide context for the embodiments of the various embodiments described herein. The following discussion is intended to provide a brief, general description of an example of a suitable environment 1200 in which the various embodiments can be implemented. While the description comprises a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, comprising single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and comprises both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic data stores, or any other medium which can be used to store the desired information and which can be accessed by the computer.

Communication media typically embodies computer-readable instructions, data structures, program modules or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be included within the scope of computer-readable media.

The handset 1200 comprises a processor 1202 for controlling and processing all onboard operations and functions.

A memory 1204 interfaces to the processor 1202 for storage of data and one or more applications 1206 (e.g., a video player software, user feedback component software, etc.). Other applications can include voice recognition of predetermined voice commands that facilitate initiation of the user feedback signals. The applications 1206 can be stored in the memory 1204 and/or in a firmware 1208, and executed by the processor 1202 from either or both the memory 1204 or/and the firmware 1208. The firmware 1208 can also store startup code for execution in initializing the handset 1200. A communications component 1210 interfaces to the processor 1202 to facilitate wired/wireless communication with external systems, e.g., cellular networks, VoIP networks, and so on. Here, the communications component 1210 can also include a suitable cellular transceiver 1211 (e.g., a GSM transceiver) and/or an unlicensed transceiver 1213 (e.g., Wi-Fi, WiMax) for corresponding signal communications. The handset 1200 can be a device such as a cellular telephone, a PDA with mobile communications capabilities, and messaging-centric devices. The communications component 1210 also facilitates communications reception from terrestrial radio networks (e.g., broadcast), digital satellite radio networks, and Internet-based radio services networks.

The handset 1200 comprises a display 1212 for displaying text, images, video, telephony functions (e.g., a Caller ID function), setup functions, and for user input. For example, the display 1212 can also be referred to as a "screen" that can accommodate the presentation of multimedia content (e.g., music metadata, messages, wallpaper, graphics, etc.). The display 1212 can also display videos and can facilitate the generation, editing and sharing of video quotes. A serial I/O interface 1214 is provided in communication with the processor 1202 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1200, for example. Audio capabilities are provided with an audio I/O component 1216, which can include a speaker for the output of audio signals related to, for example, indication that the user pressed the proper key or key combination to initiate the user feedback signal. The audio I/O component 1216 also facilitates the input of audio signals through a microphone to record data and/or telephony voice data, and for inputting voice signals for telephone conversations.

The handset 1200 can include a slot interface 1218 for accommodating a SIC (Subscriber Identity Component) in the form factor of a card Subscriber Identity Module (SIM) or universal SIM 1220, and interfacing the SIM card 1220 with the processor 1202. However, it is to be appreciated that the SIM card 1220 can be manufactured into the handset 1200, and updated by downloading data and software.

The handset 1200 can process IP data traffic through the communications component 1210 to accommodate IP traffic from an IP network such as, for example, the Internet, a corporate intranet, a home network, a person area network, etc., through an ISP or broadband cable provider. Thus, VoIP traffic can be utilized by the handset 1200 and IP-based multimedia content can be received in either an encoded or decoded format.

A video processing component 1222 (e.g., a camera) can be provided for decoding encoded multimedia content. The video processing component 1222 can aid in facilitating the generation, editing and sharing of video quotes. The handset 1200 also comprises a power source 1224 in the form of batteries and/or an AC power subsystem, which power source 1224 can interface to an external power system or charging equipment (not shown) by a power I/0 component 1226.

The handset 1200 can also include a video component 1230 for processing video content received and, for recording and transmitting video content. For example, the video component 1230 can facilitate the generation, editing and sharing of video quotes. A location tracking component 1232 facilitates geographically locating the handset 1200. As described hereinabove, this can occur when the user initiates the feedback signal automatically or manually. A user input component 1234 facilitates the user initiating the quality feedback signal. The user input component 1234 can also facilitate the generation, editing and sharing of video quotes. The user input component 1234 can include such conventional input device technologies such as a keypad, keyboard, mouse, stylus pen, and/or touch screen, for example.

Referring again to the applications 1206, a hysteresis component 1236 facilitates the analysis and processing of hysteresis data, which is utilized to determine when to associate with the access point. A software trigger component 1238 can be provided that facilitates triggering of the hysteresis component 1238 when the Wi-Fi transceiver 1213 detects the beacon of the access point. A SIP client 1240 enables the handset 1200 to support SIP protocols and register the subscriber with the SIP registrar server. The applications 1206 can also include a client 1242 that provides at least the capability of discovery, play and store of multimedia content, for example, music.

The handset 1200, as indicated above related to the communications component 1210, comprises an indoor network radio transceiver 1213 (e.g., Wi-Fi transceiver). This function supports the indoor radio link, such as IEEE 802.11, for the dual-mode GSM handset 1200. The handset 1200 can accommodate at least satellite radio services through a handset that can combine wireless voice and digital radio chipsets into a single handheld device.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. These components also can execute from various computer readable storage media comprising various data structures stored thereon. The components can communicate via local and/or remote processes such as in accordance with a signal comprising one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic data store, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a data store and/or any of the above computer-readable media.

As it employed in the subject specification, the term "processor" can refer to substantially any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of UE. A processor also can be implemented as a combination of computing processing units.

In the subject specification, terms such as "store," "data store," "data storage," "database," "repository," "queue", "storage device," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (comprising a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium comprising computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic data stores, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media.

Further, terms like "user equipment," "user device," "mobile device," "mobile," station," "access terminal," "terminal," "handset," and similar terminology, can generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary," where used, is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature can be combined with one or more other features of the other implementations as may be desired and advantageous for any given or particular application. Furthermore, to the extent that the terms "have", "having", "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art can recognize that other embodiments comprising modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:
    receiving, by a first network device comprising a processor, a text string based on a user input into a field of a graphical user interface associated with a second network device comprising a server;
    prior to storage of the text string by the second network device, determining, by the first network device, whether the text string comprises sensitive personal information, wherein the determining comprises:
        inputting the text string to a sensitive personal information tool for analysis of whether the test string comprises the sensitive personal information, and
        determining an expiration of a defined period of time without receiving a confirmation from the sensitive personal information tool that the text string does not comprise the sensitive personal information, and
        in response to the not receiving the confirmation from the sensitive personal information tool that the text string does not comprise the sensitive personal information within the defined period of time, facilitating, by the first network device, discarding the text string, by the second network device; and
    in response to determining that the text string comprises the sensitive personal information:
        facilitating, by the first network device, preventing the storage of the text string by the second network device, comprising:
            removing the sensitive personal information from the text string to generate a filtered text string, and
            sending the filtered text string to the second network device, and
        facilitating, by the first network device, providing an alert message for display on the graphical user interface comprising an indication that the text string comprises the sensitive personal information and that the sensitive personal information has not been stored, and comprising the filtered text string.

2. The method of claim 1, wherein the first network device comprises a microservice orchestration device that executes more than one instance of an application software.

3. The method of claim 1, wherein the user input into the field comprises entry of the text string into the field prior to submission of the user input to the second network device.

4. The method of claim 1, wherein the determining whether the text string comprises the sensitive personal information occurs prior to receipt of the text string by the second network device.

5. The method of claim 1, wherein the determining whether the text string comprises the sensitive personal information further comprises parsing the text string to identify the sensitive personal information.

6. The method of claim 1, wherein the text string is a first text string, and wherein the method further comprises, receiving, by the first network device, a subsequent submission of a second text string.

7. The method of claim 6, wherein the second text string is determined not to comprise the sensitive personal information.

8. The method of claim 1, further comprising, in response to determining that the text string does not comprise the sensitive personal information, facilitating, by the first network device, providing a notification message for display indicating that the text string does not comprise the sensitive personal information.

9. The method of claim 1, wherein the determining whether the text string comprises the sensitive personal information comprises referring to a configurable map indicating a type of the sensitive personal information.

10. The method of claim 9, wherein the type is a first type, and wherein the configurable map is updated with a second type of the sensitive personal information.

11. A device, comprising:
a processor; and
a memory that stores executable instructions that, when executed by the processor, facilitate performance of operations, comprising:
receiving a text string based on a user input into a field of a graphical user interface associated with a server device;
prior to storage of the text string by the server device, determining whether the text string comprises sensitive personal information, comprising:
sending the text string to a sensitive personal information tool for analysis of whether the test string comprises the sensitive personal information, and
in response to not receiving, within a time period, a verification from the sensitive personal information tool that the text string does not comprise the sensitive personal information, instructing the text string to be discarded by the server device; and
in response to determining that the text string comprises the sensitive personal information:
preventing the storage of the text string by the server device by masking the sensitive personal information, comprising:
removing the sensitive personal information from the text string to generate a modified text string, and
sending the modified text string to the server device; and
providing a notification message for display on the graphical user interface comprising an indication that the text string comprised the sensitive personal information and that the sensitive personal information has not been stored, and comprising the modified text string.

12. The device of claim 11, wherein the device comprises a microservice orchestration device that executes more than one instance of an application software.

13. The device of claim 11, wherein the user input into the field comprises entry of the text string into the field prior to submission of the user input to the server device.

14. The device of claim 11, wherein the determining whether the text string comprises the sensitive personal information occurs prior to receipt of the text string by the server device.

15. The device of claim 11, wherein the determining whether the text string comprises the sensitive personal information further comprises parsing the text string to identify the sensitive personal information.

16. The device of claim 11, wherein the notification message further comprises a type of the sensitive personal information.

17. The device of claim 11, wherein the determining whether the text string comprises the sensitive personal information comprises referring to a configurable map indicating a type of the sensitive personal information.

18. A non-transitory machine-readable medium, comprising executable instructions that, when executed by a device comprising a processor, facilitate performance of operations, comprising:
receiving a text string based on a user input into a field of a graphical user interface associated with a server device;
prior to storage of the text string by the server device, determining whether the text string comprises sensitive personal information, wherein the determining comprises:
providing the text string to a sensitive personal information tool for a determination of whether the test string comprises the sensitive personal information, and
in response to not receiving, within a defined period of time, an indication from the sensitive personal information tool that the text string does not comprise the sensitive personal information, causing the text string to be discarded by the server device; and
in response to determining that the text string comprises the sensitive personal information:
preventing the storage of the text string by the server device, comprising:
excluding the sensitive personal information from the text string to generate a sanitized text string, and
sending the sanitized text string to the server device, and providing a message for display on the graphical user interface comprising an indication that the text string comprises the sensitive personal information and that the sensitive personal information has not been stored, and comprising the sanitized text string.

19. The non-transitory machine-readable medium of claim 18, wherein the message further comprises a notification that the sensitive personal information has been masked.

20. The non-transitory machine-readable medium of claim 18, wherein the message further comprises the type of the sensitive personal information.

* * * * *